United States Patent
Qu et al.

(10) Patent No.: US 9,915,834 B2
(45) Date of Patent: Mar. 13, 2018

(54) LIGHTING-ON APPARATUS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Kun Qu, Beijing (CN); Jiujuan Yang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 174 days.

(21) Appl. No.: 14/751,604

(22) Filed: Jun. 26, 2015

(65) Prior Publication Data

US 2016/0139439 A1    May 19, 2016

(30) Foreign Application Priority Data

Nov. 17, 2014   (CN) .......................... 2014 1 0655042

(51) Int. Cl.
*G01R 1/067* (2006.01)
*G02F 1/13* (2006.01)

(52) U.S. Cl.
CPC .......... *G02F 1/1309* (2013.01); *G02F 1/1303* (2013.01)

(58) Field of Classification Search
CPC .................................................... G09G 3/006
USPC ............. 324/756.01, 756.07, 760.01, 760.02
See application file for complete search history.

(56) References Cited

U.S. PATENT DOCUMENTS

| | | | | |
|---|---|---|---|---|
| 2002/0085198 A1* | 7/2002 | Sohn | ...................... | G09G 3/006 356/237.1 |
| 2003/0112331 A1* | 6/2003 | Chen | ...................... | G09G 3/006 348/94 |
| 2005/0264309 A1* | 12/2005 | Chung | ................... | G09G 3/006 324/754.03 |

(Continued)

FOREIGN PATENT DOCUMENTS

| | | |
|---|---|---|
| CN | 101071205 A | 11/2007 |
| CN | 101887180 A | 11/2010 |

(Continued)

OTHER PUBLICATIONS

First Chinese Office Action dated Aug. 19, 2016; Appln. No. 201410655042.9.
Third Chinese Office Action dated Apr. 19, 2017; Appln. No. 201410655042.9.
Second Chinese Office Action dated Jan. 24, 2017; Appln. No. 201410655042.9.
The Fourth Chinese Office Action dated Jan. 3, 2018; Appln. No. 201410655042.9.

*Primary Examiner* — Patrick Assouad
*Assistant Examiner* — Demetrius Pretlow
(74) *Attorney, Agent, or Firm* — Ladas & Parry LLP

(57) ABSTRACT

A lighting-on apparatus comprises at least one gate line pin and further comprises a gate line pin moving unit. The at least one gate line pin is moved by the gate line pin moving unit so that the at least one gate line pin corresponds with a gate line interface of a liquid crystal display panel under test. The lighting-on apparatus according to the embodiments of the present disclosure is configured to perform a test on the liquid crystal display panel, and is capable of simplifying test work of liquid crystal display panels, saving test time and cost, and improving work efficiency.

13 Claims, 3 Drawing Sheets

(56) References Cited

U.S. PATENT DOCUMENTS

| | | | |
|---|---|---|---|
| 2006/0087327 A1* | 4/2006 | Ueno | G09G 3/006 324/713 |
| 2006/0170447 A1* | 8/2006 | Maeda | G09G 3/3611 324/760.01 |
| 2007/0046319 A1* | 3/2007 | Kang | G09G 3/006 324/754.03 |
| 2009/0215347 A1* | 8/2009 | Lee | G09G 3/006 445/3 |
| 2014/0078026 A1* | 3/2014 | Du | G09G 3/006 345/55 |
| 2014/0111485 A1* | 4/2014 | Welch | H04N 17/00 345/178 |
| 2014/0292366 A1 | 10/2014 | Wang et al. | |
| 2016/0240121 A1 | 8/2016 | Zhang et al. | |

FOREIGN PATENT DOCUMENTS

| | | |
|---|---|---|
| CN | 102621731 A | 8/2012 |
| CN | 102736276 A | 10/2012 |
| CN | 102789075 A | 11/2012 |
| CN | 103135268 A | 6/2013 |
| CN | 202995185 U | 6/2013 |
| CN | 103268027 A | 8/2013 |
| CN | 103885220 A | 6/2014 |
| JP | 2000-292493 A | 10/2000 |
| KR | 1020100096546 A | 9/2010 |

* cited by examiner

LIGHTING-ON APPARATUS

TECHNICAL FIELD

Embodiments of the present disclosure relate to a lighting-on apparatus.

BACKGROUND

In the manufacturing process of TFT-LCD (Thin Film Transistor Liquid Crystal Display), it is necessary to perform lighting-on test on liquid crystal display panels to detect whether there is a bright spot or a bright line on the liquid crystal display panels.

In conventional technology, the lighting-on apparatus is provided with a gate line test board and a data line test board which are adapted to the liquid crystal display panel under test. The gate line pins provided on the gate line test board correspond with the gate line interface of the liquid crystal display panel under test. The data line pins provided on the data line test board correspond with the data line interface of the liquid crystal display panel under test. There are following steps in testing a liquid crystal display panel, placing the liquid crystal display panel under test on the lighting-on apparatus; connecting the gate line interface of the liquid crystal display panel under test to the gate line pins of the gate line test board and connecting the data line interface of the liquid crystal display panel under test to the data line pins of the data line test board; lighting on backlight; controlling the display panel under test by the gate line pins and the data line pins; testing whether the liquid crystal display panel under is working properly and whether there is a bright spot or a bright line.

However, there are many models of liquid crystal display panels, the gate line interface is located in a different position in each model. To meet the test requirement for each model of liquid crystal display panel, it is necessary to prepare a corresponding gate line test board for each model of liquid crystal display panel. When testing different models of liquid crystal display panels, operators are required to constantly replace the gate line test board with the one adapted to the liquid crystal display panel under test, which makes the test of liquid crystal display panels complicated, time-consuming and less efficient and increases the cost of the test process at the same time.

SUMMARY

At least one embodiment of the present disclosure provides a lighting-on apparatus, comprising at least one gate line pin, and further comprising a gate line pin moving unit, wherein the at least one gate line pin is moved by the gate line pin moving unit so that the at least one gate line pin corresponds with a gate line interface of a liquid crystal display panel under test.

The lighting-on apparatus according to the embodiments of the present disclosure can move the gate line pin by means of the gate line pin moving unit according to the gate line interface of the liquid crystal display panel under test so that the gate line pin corresponds with the gate line interface of the liquid crystal display panel under test, thereby eliminating a step of replacing the gate line test board by an operator when different models of liquid crystal display panels are tested, simplifying test work of liquid crystal display panels, saving detection time and cost, and improving work efficiency.

In one embodiment of the present disclosure, the lighting-on apparatus further comprises at least one data line pin and a data line pin moving unit, wherein the at least one data line pin is moved by the data line pin moving unit so that the at least one data line pin corresponds with a data line interface of the liquid crystal display panel under test.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
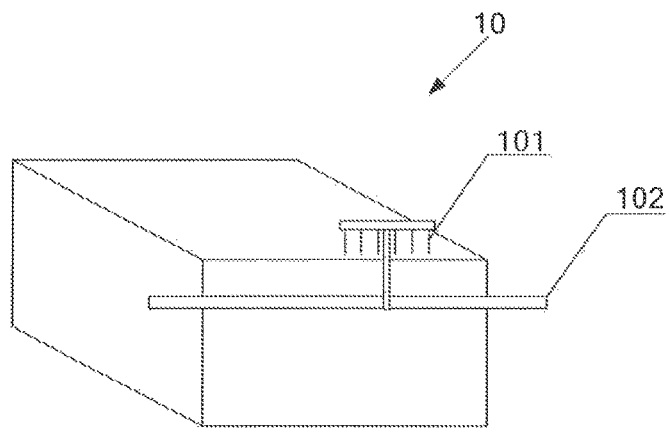
FIG. 1 is a schematic structural view of a lighting-on apparatus according to an embodiment of the present disclosure.

At least one embodiment of the present disclosure provides a lighting-on apparatus 10. As illustrated in FIG. 1, the lighting-on apparatus 10 comprises at least one gate line pin 101. The lighting-on apparatus 10 further comprises a gate line pin moving unit 102, which moves the at least one gate line pin 101 so as to make the at least one gate line pin 101 correspond with a gate line interface of the liquid crystal display panel under test.

In practical test work, if two liquid crystal display panels that are to be tested successively have different gate line interfaces, the gate line pin 101 can be moved by the gate line pin moving unit 102 so that the gate line pin 101 can be adapted to the gate line interface of the liquid crystal display panel which will be tested in next with moving the gate line pin 101 by means of the gate line pin moving unit 102 and without replacing the gate line test board.

Thus, the gate line pin 101 in the lighting-on apparatus 10 can be moved by means of the gate line pin moving unit 102 according to the gate line interface of the liquid crystal display panel under test, so that the gate line pin 101 is made to correspond with the gate line interface of the liquid crystal display panel under test, thereby eliminating a step of replacing the gate line test board by an operator when testing different models of liquid crystal display panels, simplifying test work of liquid crystal display panels, saving test time and cost, and improving work efficiency.

Further, the lighting-on apparatus 10 comprises at least two gate line pins 101. The gate line pin moving unit 102 is configured to adjust the interval between two adjacent gate line pins 101 among the at least two gate line pins 101.

In general, each liquid crystal display panel has a plurality of gate line interfaces and different models of liquid crystal display panels have different positions of gate line interfaces and different intervals between adjacent gate line interfaces. Therefore, in practical test work, if the liquid crystal display panels that are to be tested, successively have different intervals of the gate line interfaces, the gate line pins can be moved by the gate line pin moving unit 102, so that the gate line pins 101 of the lighting-on apparatus 10 can be adapted to the gate line interface of the liquid crystal display panel to be tested in next by moving the gate line pins by means of the gate line pin moving unit 102 and without replacing the gate line test board after the test of the liquid crystal display panel that is tested at first has completed.

Figure 2:
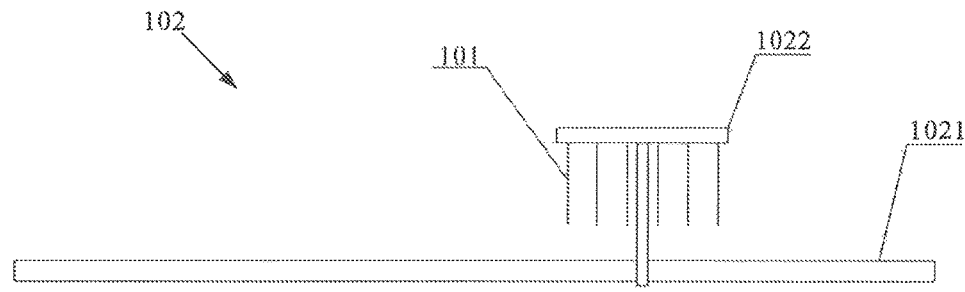
FIG. 2 is a schematic structural view of a gate line pin moving unit according to an embodiment of the present disclosure.

Alternatively, as illustrated in FIG. 2, the gate line pin moving unit 102 comprises a first guide rail 1021 and a first slider 1022 which is slidable along the first guide rail 1021. The gate line pins 101 are provided on the first slider 1022. The gate line pin moving unit 102 is configured to move the gate line pins 101 by sliding the first slider 1022.

When testing the liquid crystal display panel under test, the at least one gate line pin 101 is provided on the first slider 1022 along a direction of the first guide rail 1021. Since the gate line pin is provided on the first slider 1022 which is slidable on the first guide rail 1021, the position of the gate line pin 101 can be changed by moving the first slider 1022 and thus the gate line pins of the lighting-on apparatus 10 are made to correspond with the gate line interface of the liquid crystal display panel under test.

The gate line pin moving unit can further comprise a first worm gear and a first worm which are engaged with each other. The at least one gate line pin is provided on the first worm gear in a direction of the first worm. The gate line pin moving unit rotates the first worm so as to drive the first worm gear to move, and further the gate line pin is moved so that the gate line pin corresponds with the gate line interface of the liquid crystal display panel under test.

Figure 3:
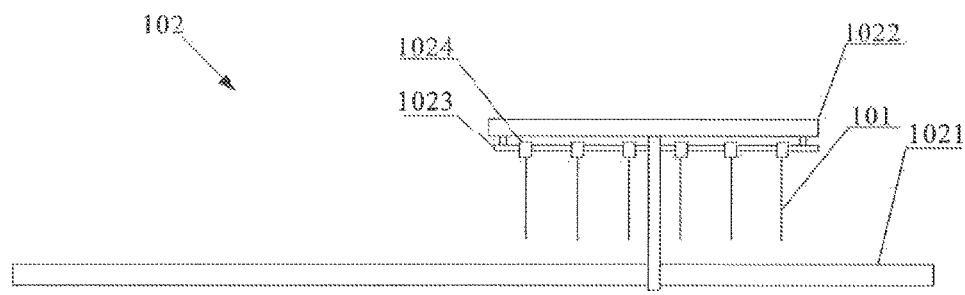
FIG. 3 is a schematic structural view of another gate line pin moving unit according to an embodiment of the present disclosure.

Alternatively, as illustrated in FIG. 3, a second guide rail 1023 and at least one second slider 1024 are provided on the first slider 1022. The gate line pin 101 and the second slider 1024 are corresponding to each other one by one. The distance between two adjacent gate line pins 101 among the at least two gate line pins 101 is adjusted by sliding each of the second sliders 1024.

When testing the liquid crystal display panel under test, since the gate line pins on the first slider 1022 are provided on the second sliders 1024 and the number of the gate line pins 101 is equal to that of the second sliders 1024 which are provided on the second guide rail 1023 and are slidable on the second guide rail 1023 provided on the first sliders 1022, the interval between adjacent gate line pins 101 can be changed by moving each of the second sliders 1024, and the gate line pins can be moved by the first slider 1022 at the same time, so that the gate line pins of the lighting-on apparatus 10 are made to correspond with the gate line interface of the liquid crystal display panel under test.

For example, assuming there are six gate line pins in the gate line pin moving unit and assuming that the current distance between two adjacent gate line pins is 1 mm (millimeter), and the distance of the gate line interface of the liquid crystal display panel under test is 2 mm, in order to make the gate line pins correspond with the gate line interface of the liquid crystal display panel under test, the gate line pins are required to be moved so that the distance between two adjacent gate line pins is 2 mm. Given that the first gate line pin is stationary in position, the second gate line pin adjacent thereto is to be moved by 1 mm so that the distance between the first gate line pin and the second gate line pin is 2 mm. And then, the third gate line pin adjacent to the second gate line pin is moved by 2 mm, the fourth gate line pin adjacent to the third gate line pin is moved by 3 mm, the fifth gate line pin adjacent to the fourth gate line pin is moved by 4 mm, and the sixth gate line pin adjacent to the fifth gate line pin is moved by 5 mm. By doing this, it can be ensured that the distance between every two adjacent gate line pins is 2 mm and corresponds with the gate line interface of the liquid crystal display panel under test.

In one embodiment, the gate line pin moving unit can comprise a second worm and at least one second worm gear. The gate line pins correspond to the second worm gears one by one. The second worm is provided on the first worm gear. The second worm gear is engaged with the second worm. The gate line pins can be provided on the second worm gear. The gate line pin moving unit drives the second worm gear to move by rotating the second worm and moves the gate line pins so that the distance between two adjacent gate line pins can be adjusted.

Alternatively, the first guide rail 1021 and the second guide rail 1023 are provided with scales thereon. The first slider 1022 and the second slider 1024 can be accurately moved in accordance with the scales on the first guide rail 1021 and the second guide rail 1023, so that the gate line pins of the lighting-on apparatus 10 precisely correspond with the gate line interface of the liquid crystal display panel under test.

Figure 4:
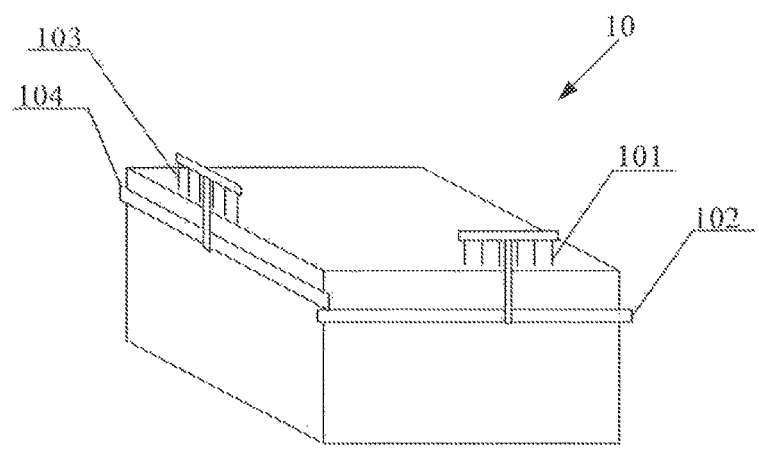
FIG. 4 is a schematic structural view of another lighting-on apparatus according to an embodiment of the present disclosure.

Further, as illustrated in FIG. 4, the lighting-on apparatus 10 further comprises at least one data line pin 103 and a data line pin moving unit 104 which moves the at least one data line pin 103 so that the at least one data line pin 103 is made to correspond with the data line interface of the liquid crystal display panel under test.

In general, different models of liquid crystal display panels have different gate line interface positions, and data line interface positions will be different as well. Likewise, to meet the test requirement for different models of liquid crystal display panels, it is necessary to make an adaptive data line test board for each model of liquid crystal display panel. When testing different models of liquid crystal display panels, operators are required to continuously replace the data line test board with the one adapted to the liquid crystal display panel under test manually, which makes the test of the liquid crystal display panels complicated, time-consuming, less efficient and increases the cost of the test process. To simplify test process, the lighting-on apparatus 10 further comprises a data line pin moving unit 104. Through moving the data line pins 103 of the lighting-on apparatus by the data line pin moving unit 104, it is not necessary for the operators to replace the data line test board when testing different models of liquid crystal display panels, thereby simplifying test work of liquid crystal display panels, saving test time and cost, and improving work efficiency.

Further, the lighting-on apparatus 10 further comprises at least two data line pins 103. The data line pin moving unit 104 is configured to adjust the intervals between two adjacent data line pins 103 among the at least two data line pins 103.

In general, each liquid crystal display panel has a plurality of data line interfaces and different models of liquid crystal display panels have different data line interface positions and different intervals between adjacent data line interfaces as well. Therefore, in practical test work, if the liquid crystal display panels that are to be tested successively have different intervals of the data line interfaces, the data line pins 103 can be moved by the data line pin moving unit 104, so that the data line pins 103 of the lighting-on apparatus are made to correspond with the data line interface of the second liquid crystal display panel that will be tested in next, by moving the data line pins 103 by means of the data line pin moving unit 104 and without replacing the data line test board after the testing for the liquid crystal display panel that is tested at first has finished.

Figure 5:
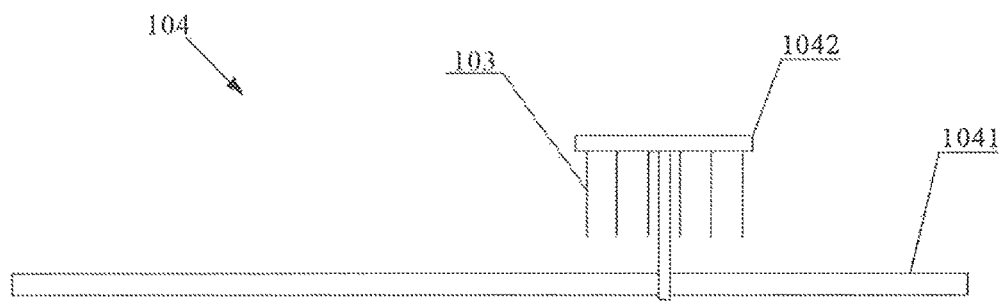
FIG. 5 is a schematic structural view of a data line pin moving unit according to an embodiment of the present disclosure.

Alternatively, as illustrated in FIG. 5, the data line pin moving unit 104 comprises a third guide rail 1041 and a third slider 1042 which is slidable along the third guide rail 1041. The data line pins 103 are provided on the third slider 1042. The data line pins 103 can be moved by sliding the third slider 1042.

When testing a liquid crystal display panel under test, since the data line pin is provided on the third slider 1042 which is slidable on the second guide rail 1041, the position of the data line pin 103 can be changed by moving the third slider 1042 and thus the data line pins of the lighting-on apparatus 10 are made to correspond with the data line interface of the liquid crystal display panel under test.

In practical application, the data line pin moving unit can further comprise a third worm gear and a third worm, which are engaged with each other. The at least one data line pin is provided on the third worm gear in a direction of the third worm. The data line pin moving unit drives the third worm gear to move by rotating the third worm and moves the data line pin so that the data line pin corresponds with the data line interface of the liquid crystal display panel under test.

Figure 6:
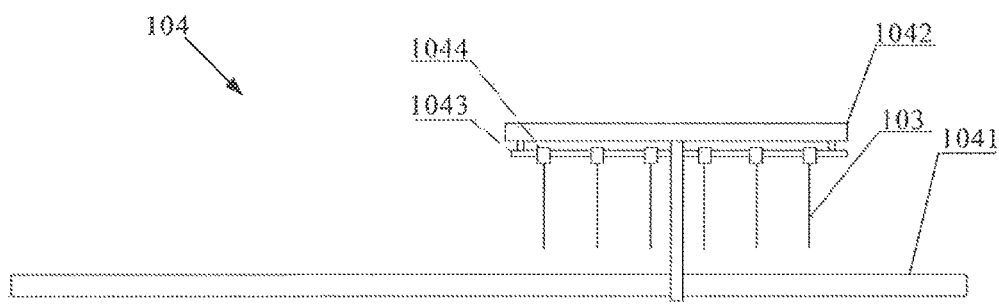
FIG. 6 is a schematic structural view of another data line pin moving unit according to an embodiment of the present disclosure.

Alternatively, as illustrated in FIG. 6, a fourth guide rail 1043 and at least one fourth slider 1044 are provided on the third slider 1042. The data line pin 103 and the fourth slider 1044 are corresponding to each other one by one. The data line pin moving unit 104 adjusts the distance between two adjacent data line pins 103 among the at least two data line pins 103 by sliding each of the fourth sliders 1044.

When testing the liquid crystal display panel under test, since the data line pins 103 on the third slider 1042 are provided on the fourth sliders 1044 one by one and the number of the data line pins 103 is equal to that of the fourth sliders 1044 which are provided on the fourth guide rail 1043 and are slidable on the fourth guide rail 1043 provided on the third sliders 1042, the intervals between adjacent data line pins 103 can be changed by moving each of the fourth sliders 1044 and the data line pins can be moved by the third slider 1042 at the same time, so that the data line pins of the lighting-on apparatus 10 are made to correspond with the data line interface of the liquid crystal display panel under test.

For example, assuming there are six data line pins in the data line pin moving unit, and assuming that the current distance between two adjacent data line pins is 1 mm (millimeter), and the distance of the data line interface of the liquid crystal display panel under test is 2 mm, in order to make the data line pins correspond with the data line interface of the liquid crystal display panel under test, the data line pins are required to be moved so that the distance between two adjacent data line pins is 2 mm. Given that the first data line pin is stationary in position, the second data line pin adjacent thereto is to be moved by 1 mm so that the distance between the first data line pin and the second data line pin is 2 mm. And then, the third data line pin adjacent to the second data line pin is moved by 2 mm, the fourth data line pin adjacent to the third data line pin is moved by 3 mm, the fifth data line pin adjacent to the fourth data line pin is moved by 4 mm, and the sixth data line pin adjacent to the fifth data line pin is moved by 5 mm. By doing this, the distance between every two adjacent data line pins is made to be 2 mm.

In one embodiment, the data line pin moving unit can comprise a fourth worm and at least one fourth worm gear. The data line pins are corresponding to the fourth worm gears one by one. The fourth worm is provided on the third worm gear. The fourth worm gear is engaged with the fourth worm. The data line pins can be provided on the fourth worm gear. The data line pin moving unit drives the fourth worm gear to move by rotating the fourth worm and thus can adjust the distance between two adjacent data line pins.

Alternatively, the third guide rail and the fourth guide rail are provided with scales thereon. The third slider 1042 and the fourth slider 1044 can be accurately moved in accordance with the scales on the third guide rail 1041 and the fourth guide rail 1043, so that the data line pins of the lighting-on apparatus 10 precisely correspond with the data line interface of the liquid crystal display panel under test.

Figure 7:
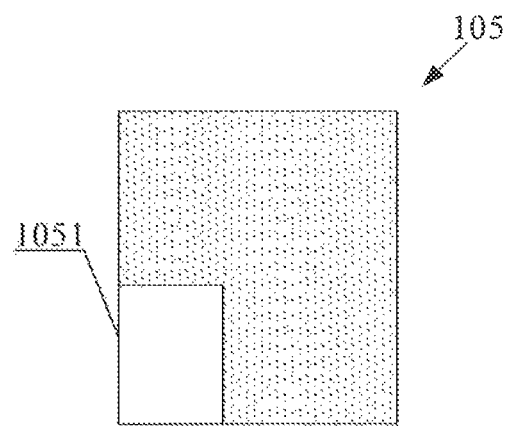
FIG. 7 is a schematic structural view of a light barrier according to an embodiment of the present disclosure.
Figure 8:
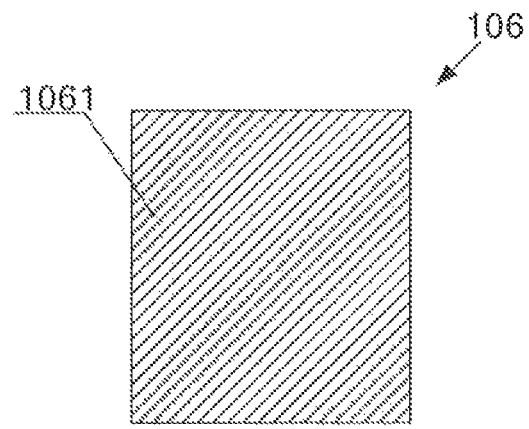
FIG. 8 is a schematic structural view of a polarizing plate according to an embodiment of the present disclosure.

Alternatively, since the liquid crystal display panels under test have different models, they have different transmissive areas and polarization directions. The transmissive area is a light transmitting area of a liquid crystal display panel. The polarization direction is the up-down direction of a liquid crystal display panel. Therefore, the lighting-on apparatus 10 according to the embodiment of the present disclosure further comprises a socket in which a light barrier 105 having a size suitable for the liquid crystal display panel under test and/or a polarizing plate 106 having a size suitable for the liquid crystal display panel under test are/is placed. The light barrier 105 is illustrated in FIG. 7, in which a region 1051 corresponds to the transmissive area of the liquid crystal display panel under test and remaining regions can be coated with light-shielding material. In practical applications, a plurality of light barriers can be prepared according to particular circumstances, each of which has a transmissive area with a different dimension. When testing the liquid crystal display panel, a suitable light barrier can be selected and placed into the socket in accordance with the dimension of the liquid crystal display panel under test. The polarizing plate 106 is illustrated in FIG. 8, in which a direction as indicated by the reference numeral 1061 is the polarization direction of the polarizing plate 106. In practical applications, a plurality of polarizing plates can be prepared according to particular circumstances, each of which has a different polarization direction. When testing the liquid crystal display panel, a suitable polarizing plate can be selected and placed into the socket in accordance with the type of the liquid crystal display panel under test, and are used along with the light barrier to test the liquid crystal display panel under test. The transmissive area of the lighting-on apparatus 10 can be made identical with the transmissive area of the liquid crystal display panel under test by using different light barriers.

The lighting-on apparatus according to at least one embodiment of the present disclosure comprises at least one gate line pin. The lighting-on apparatus further comprises a gate line pin moving unit which moves the at least one gate line pin so as to make the at least one gate line pin correspond with the gate line interface of the liquid crystal display panel under test. Comparing with conventional technology, the lighting-on apparatus according to the embodiments of the present disclosure can move the gate line pins by use of the gate line pin moving unit in accordance with the gate line interface of the liquid crystal display panel under test so as to make the gate line pins correspond with the gate line interface of the liquid crystal display panel under test. Therefore, when testing liquid crystal display panels of different models, it is not necessary to manually replace the gate line test board, thereby simplifying test work of liquid crystal display panels, saving test time and cost, and improving work efficiency.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201410655042.9 filed on Nov. 17, 2014, the disclosure of which is hereby entirely incorporated by reference.

The invention claimed is:

1. A lighting-on apparatus, comprising at least one gate line pin, and further comprising a gate line pin moving unit, wherein the at least one gate line pin is moved by the gate line pin moving unit so that the at least one gate line pin corresponds with a gate line interface of a liquid crystal display panel under test;
the gate line pin moving unit comprises a first guide rail and a first slider which slides on the first guide rail, and the gate line pin is provided on the first slider; and
a second guide rail and at least one second slider are provided on the first slider, the gate line pin is disposed on the second slider in a manner that one gate line pin corresponds to one second slider, and each of the at least one second slider is slidable along the second guide rail.

2. The lighting-on apparatus according to claim 1, wherein the lighting-on apparatus comprises at least two gate line pins, and
the gate line pin moving unit is configured to adjust a distance between two adjacent gate line pins among the at least two gate line pins.

3. The lighting-on apparatus according to claim 1, comprising at least one data line pin and a data line pin moving unit, wherein
the at least one data line pin is moved by the data line pin moving unit so that the at least one data line pin corresponds with a data line interface of the liquid crystal display panel under test.

4. The lighting-on apparatus according to claim 3, wherein the lighting-on apparatus comprises at least two data line pins, and the data line pin moving unit is configured to adjust a distance between two adjacent data line pins among the at least two data line pins.

5. The lighting-on apparatus according to claim 1, wherein the first guide rail and/or the second guide rail is provided with scales.

6. The lighting-on apparatus according to claim 4, wherein
the data line pin moving unit comprises a third guide rail and a third slider which slides on the third guide rail, and the data line pin is provided on the third slider.

7. The lighting-on apparatus according to claim 6, wherein
a fourth guide rail and at least one fourth slider are provided on the third slider, the data line pin is provided on the fourth slider in a manner that one data line pin corresponds to one fourth slider, and each of the at least one fourth slider is movable along the fourth guide rail.

8. The lighting-on apparatus according to claim 7, wherein the third guide rail and/or the fourth guide rail is provided with scales.

9. The lighting-on apparatus according to claim 1, wherein
the lighting-on apparatus further comprises a socket in which a light barrier or a polarizing plate having a size suitable to the liquid crystal display panel under test is placed.

10. The lighting-on apparatus according to claim 2, wherein
the lighting-on apparatus further comprises a socket in which a light barrier or a polarizing plate having a size suitable to the liquid crystal display panel under test is placed.

11. The lighting-on apparatus according to claim 4, wherein
the lighting-on apparatus further comprises a socket in which a light barrier or a polarizing plate having a size suitable to the liquid crystal display panel under test is placed.

12. The lighting-on apparatus according to claim 2, further comprising at least one data line pin and a data line pin moving unit, wherein
the at least one data line pin is moved by the data line pin moving unit so that the at least one data line pin corresponds with a data line interface of the liquid crystal display panel under test.

13. The lighting-on apparatus according to claim 5, wherein
the data line pin moving unit comprises a third guide rail and a third slider which is slidable on the third guide rail, and the data line pin is provided on the third slider.

* * * * *